Oct. 29, 1957     F. M. DEMER     2,811,710

SCALAR FLUX MAGNETIC CORE DEVICES

Filed Feb. 1, 1955

INVENTOR
FREDERICK MURRAY DEMER

BY
ATTORNEY

United States Patent Office 2,811,710
Patented Oct. 29, 1957

2,811,710

SCALAR FLUX MAGNETIC CORE DEVICES

Frederick Murray Demer, Johnson City, N. Y., assignor to International Business Machines Corporation, New York, N. Y., a corporation of New York Application February 1, 1955, Serial No. 485,477

5 Claims. (Cl. 340—174)

This invention relates to magnetic control devices and particularly to the working of bistable magnetic memory elements.

The object of the present invention is to provide a means for producing a read out signal upon the change of state of a bistable magnetic element.

The present invention consists essentially of a cooperatively interlinked pair of magnetic elements or cores, one of the conventionally high retentivity material and the other of directly opposed characteristics. One of these cores has a substantially square hysteresis loop and will retain practically the full magnetic flux density to which it may have been driven in either the positive or negative sense. When thus positively energized, any amount of negative energization up to a critical amount will not change the state thereof but when this critical value is exceeded a flip-flop action takes place and the core becomes negatively energized and will thereafter remain so energized indefinitely. The other core will retain almost no residual flux, in other words it is constructed of extremely low retentivity material. The two cores are interlinked in such manner that they have a common section whereby the flux through one traverses the other generally in a direction normal to the flux in the other.

While the flux in each is a combination of two components it would be difficult to represent this geometrically by a vector diagram since the path of the principal flux in each is complex and, particularly about the common section, is what might be termed sinuous. The magnetic behaviour of materials subject to crossed M. M. F.'s is complex, but experiments yield certain data which shows that the normal hysteresis curve is narrowed and tilted when a small section of the material is subjected to an M. M. F. at right angles to the established flux path. The net result constitutes an increase in the reluctance of the magnetic circuit and a consequent decrease in the flux for a given drive under the crossed M. M. F. condition. Thus the flux will have a transient increase when the value of the crossed flux is transiently decreased.

A possible explanation of this apparent and unexpected increase in reluctance is that the residual flux in the core of high retentivity forces the flux in the core of low retentivity to serially traverse both cores and thus traverse a longer path whereas when the flux in the core of high retentivity is reduced to a zero value the flux in the core of low retentivity finds a straight (and much shorter) path through the common section. If the principal flux in one core is changed, as when the bistable core is driven from a positive to a negative energization and it therefore transiently passes through a zero value, then the scalar flux in the other core being transiently increased in value will produce an output signal in a coil interlinked with the core carrying this scalar flux.

It is to be noted that since the direction of the principal flux in the said other (low retentivity) core remains the same at all times the output signal is uniform regardless of the action in the bistable element, that is, the output signal produced in the signal coil of the low retentivity core is the same when the high retentivity core passes from a positive to a negative energization as when this high retentivity core passes from a negative to a positive energization.

In a preferred embodiment of the invention, the high retentivity core is provided with two energizing coils, one to produce saturation in the positive sense and the other to produce saturation in the negative sense. Thus the energization of either will cause a change in state to its own sense. If the core prior to the energization of one of these coils was already in such state no result will be induced in the signal coil of the other core, but if the core prior to the energization of said one of these coils was in the opposite state, then the change in state and the consequent passage through a zero value will induce a signal in such signal coil of the other core.

Again, in a preferred embodiment of the invention the common section of the two physically interlinked cores consists of the low retentivity material, that is the low retentivity core is a complete ring and there is a gap in the high retentivity ring thus filled with the low retentivity material.

A feature of the invention is the combination of two physically interlinked magnetic cores, one of high retentivity and permanently energized and the other of low retentivity and electromagnetically energized. Thus a flux may be produced in the core of low retentivity material which will be reduced somewhat in value by the flux permanently present in the other core and which passes through the common section of the two cores.

Another feature of the invention is a bistable magnetic memory element combined with means for producing a uniform output signal upon a change in state thereof in either direction. Since the output signal depends upon the rate of change of the flux in the associated core of low retentivity material and since this change is brought about during the change in state of the flux in the bistable element and is particularly due to the passage thereof through the zero value, the intensity of the output signal may be controlled or adjusted in various ways but the direction thereof may not be affected. The value of the flux in the associated core of low retentivity material depends on several factors including the point of operation on its hysteresis curve, the nature of the material and the relative geometrical size of the common section of the two cores in comparison with the length of the path in the bistable element. Since the rate of change in the value of the scalar flux depends on the rate of change of the flux in the bistable element during its passage through a zero value, an output signal of significant value and of uniform direction may be obtained.

Another feature of the invention is a means for sensing a change in state of a bistable element, consisting of a signal coil interlinked with a separate magnetic circuit included in part in the magnetic circuit of said bistable element. Since the flux in said separate magnetic circuit is unidirectional but depends in value on the flux in the said bistable element it is only when the change of state occurs that there will be a change in value of the flux in this separate magnetic circuit and since the change in state is very rapid, the rate of change produced in this separate magnetic circuit is sufficient to produce a signal in said coil.

Other features will appear hereinafter.

The drawings consist of a single sheet having four figures, as follows.

Figure 1:
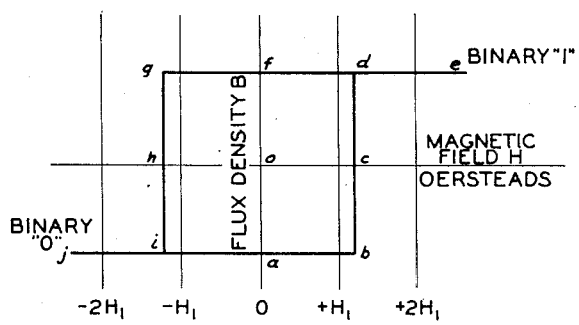
Fig. 1 is an idealized hysteresis loop of the bistable core material used for the purposes of the present invention.

The basic element employed for the purposes of the present invention is a bistable magnetic core interlinked with the magnetic circuits of a plurality of windings. Such magnetic material is characterized by high retentivity whereby the field strength attained upon saturation in either the positive or the negative direction is largely retained after the magnetomotive force applied is relaxed. Fig. 1 is an idealized hysteresis loop for such a commercially obtainable material. If the core is in the state of remanence indicated by the point $a$, then an application of any degree of negative magnetomotive force or of up to something slightly over $+H_1$ will not change this state and upon relaxation of the magnetomotive force the material of the core will return to the point $a$. However, if a good deal more than $+H_1$ is applied so that the point $b$ is passed, then the curve $abcde$ will be traced and upon relaxation the state of remanence will retreat to the point $f$, which can only be altered thereafter by the application of a negative magnetomotive force sufficient to pass the knee of the curve $g$. Thus the element may be driven to one or another stable state at will. A change of state may be detected by observing a pulse induced in a winding about such a core by the collapse of the field in one direction and its build up in the other direction.

The symbols used in this figure are those normally associated with matrix entry and are used herein merely by way of example. It will appear hereinafter that but a single coil is employed to cause a change in state, such coil providing an energization sufficient to drive the core beyond the knee of the curve.

Figure 2:
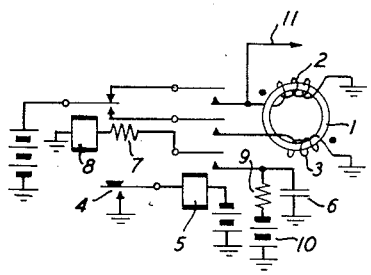
Fig. 2 is a schematic circuit diagram employed to explain the phenomenon used in the basic operations of the devices of the present invention.

Fig. 2 is a simple circuit diagram showing how such a core may be driven from one state of remanence to another. The core 1 is interlinked with the magnetic circuits of two windings 2 and 3, shown by the polarity dots to be capable of magnetizing the core in opposite directions. Let us assume that the coil 2 will drive the core 1 to that state of remanence ($a$ in Fig. 1) which we shall term binary 0 and that coil 3 will drive the core 1 to the opposite state ($f$ in Fig. 1) which we shall term binary 1. If the key 4 is operated an obvious circuit will be closed for relay 5 and this relay in operating will close another circuit for the discharge of condenser 6 through the resistor 7 and the winding of relay 8. Condenser 6 is normally charged through the resistance 9 to the potential of battery 10. The resistance 9 is high and the resistance 7 is low so that the discharge of the condenser 6 through the winding of relay 8 causes this relay to be transiently operated.

Upon the operation of relay 8 the coil 3 will be energized to drive the core 1 to binary 1, which change in state, as hereinbefore mentioned may be detected and employed for any desired purpose by the use of another winding or even by the winding 2 as indicated by the output tap 11. When, thereafter, the relay 8 is released (the resistance 9 is too high to maintain relay 8 operated), then the circuit for coil 3 will be opened and the coil 2 will be closed until relay 5 is released. Coil 2 will energize the core 1 oppositely and it will be driven from binary 1 to binary 0. This circuit is used merely for purposes of explanation and it will be realized that coils for the positive and for the negative energization of a core may be switched in many different ways in accordance with the manner in which such a bistable element is to be used.

It will be realized that a signal will appear on output tap 11 both on the energization of coil 2 and on the later energization of coil 3 but these signals will be opposed in direction. In accordance with the present invention it will appear that the output signal is uniform, that is the signal on the change in state from binary 0 to binary 1 will be indistinguishable from the signal on the change in state from binary 1 to binary 0.

Figure 3:
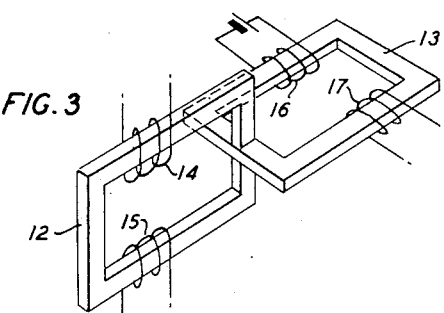
Fig. 3 is a perspective view of two physically interlinked cores with an indication of the coils wound thereon.

In Fig. 3, two cores 12 and 13 are shown physically interlinked in such manner that the lines of flux in one traverse the common section of the two cores at right angles to the lines of flux in the other. Let us assume that core 12 is a bistable element, that is, it is constructed of high retentivity magnetic material having characteristics such as that represented by the hysteresis curve of Fig. 1. A coil 14 is provided to drive this core in one direction (say to binary 1) and a coil 15 is provided to drive this core in the opposite direction (to binary 0). Obviously a single coil with proper external circuitry could be employed for the same purpose.

The other core 13 is constructed of high permeability and low retentivity magnetic material and normally will have no flux therein excepting that through the said common section. However, a coil 16 is provided which may be connected to a source of direct current so that the core may be electromagnetically energized. In operation such energization may be continuously maintained to produce a constant scalar flux.

Given a constant energization of the coil 16, then the reluctance of the core 13 and the flux therein, is constant regardless of the direction of the residual flux in core 12 since such residual flux has equal numerical values in either direction. When core 12 is driven from one state to the other, the flux therein diminishes to zero and then increases to the original value but in the opposite direction. A transient result of this change in the numerical value of the flux in core 12 and thus in the common section of the two cores is an alteration in the reluctance of the normal flux path in core 13. This alteration is such as to transiently diminish the reluctance so that the flux in core 13 transiently increases and then resumes its original value. This is represented by the graph in Fig. 4 where the flux in core 13 is shown as having a transient increase.

Figure 4:
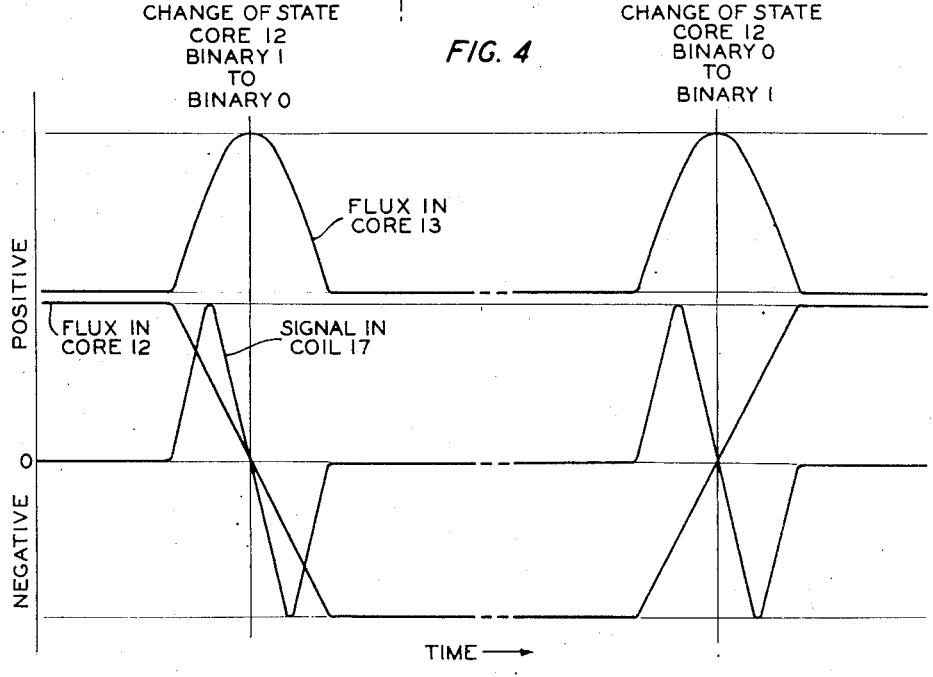
Fig. 4 is a set of idealized graphs showing the fall and rise of the scalar flux in one of the coils as the state of energization in the other is changed and the nature of the signal produced thereby.

The alteration of the flux in core 13 is not directly dependent on the value of the flux therein, but is also a function of the magnetic characteristics of this core and since this varies and is difficult to plot, these graphs of Fig. 4 are idealized (with the time element greatly exaggerated) particularly as the exact shape thereof is immaterial. The important point is that the resultant signal in the coil 17 is bi-polar and is of the same configuration when the flux in core 12 changes from positive to negative as when such flux changes from negative to positive.

In Fig. 4, three graphs are shown, first a graph of the residual flux in core 12 through two changes, second a graph of the flux in core 13, and third a graph of the potential changes in the coil 7. It will be noted that the flux in core 12 is originally at a positive value and that the first change constitutes a change of state from such positive value to an equal negative value and that the second change constitutes a change of state from a negative value to the original positive value. Despite these two oppositely directed changes, the flux in core 13 changes in each instance from a given positive value through a transient increase, which change thereby produces a uniform potential response in the coil 17.

As shown in Fig. 3 and as described so far, the bistable element 12 is provided with a gap where it intersects the core 13 and the core 13 is continuous. Within the spirit of the invention, these arrangements may be reversed, the core 13 representing the core of high retentivity material and the core 12 representing the low retentivity material. The choice of one or the other is an engineering problem.

The continuous energization of the core 13 may be produced in any conventional manner. As described hereinbefore the coil 16 may be connected to a source of direct current whereby the core is electromagnetically energized. Alternatively the core may be constructed of a magnetic material having a value of retentivity sufficient to provide a small permanent magnetic field but not great enough to overwhelm the signal in coil 17.

The rectangular shape of the cores 12 and 13 is merely by way of example and is used for clear illustration. It will be understood that other forms may be used, such as toroids, and that the intersection of the two may not necessarily be geometrically at right angles, it being only necessary that the two cores have a common section.

What is claimed is:

1. The combination of a bistable magnetic core and a core of low retentivity interlinked through a common section, each said core being in loop form and having an individual closed magnetic circuit, coil means interlinked with said bistable core for driving said core to one or the other of its stable states, means for producing a constant magnetic energization of the other of said cores and means including an output signal coil interlinked with said other of said cores for deriving an invariably characterized transient signal when said bistable core is driven from either one to the other of its stable states.

2. The combination of a bistable magnetic core and a core of low retentivity interlinked through a common section, each said core being in loop form and having an individual closed magnetic circuit, coil means interlinked with said bistable core for driving said core from one to the other of its stable states, a coil interlinked with said core of low retentivity for electromagnetizing the same, and means including an output signal coil interlinked with the core last mentioned for deriving a transient signal of uniform direction irrespective of the direction of shift between said bistable states of the first mentioned core.

3. A magnetic memory element consisting of a bistable magnetic core having a coil interlinked therewith for driving said core from one stable magnetic state to another, another magnetic core arranged in association with said first core through a common section, each said core being in loop form and having an individual closed magnetic circuit, the magnetic circuits of said two cores being arranged in parallel through said common section, and means for maintaining a unidirectional flux in said other magnetic core, whereby transient changes in the magnetic state of said first core produce transient changes in the value of said unidirectional flux in said second core.

4. A magnetic memory element consisting of a pair of magnetic cores intersecting each other in a common section, each said core being in loop form and having an individual closed magnetic circuit, said cores lying in planes normal to each other whereby the normal direction of the flux in each crosses the other at right angles, one of said cores being constructed of magnetic material of high retentivity and the other being constructed of magnetic material of low retentivity, means for maintaining a unidirectional flux in said core of low retentivity and means for reversing remanent flux in said core of high retentivity and, a coil interlinked with said core of low retentivity for transmitting a signal transiently created by the said reversal of said remanent flux in said core of high retentivity.

5. A magnetic memory element consisting of a pair of magnetic cores each in the form of a loop and each having an individual closed magnetic circuit, said cores being physically interlinked through a common section, one of said cores being constructed of magnetic material of high retentivity and being provided with a coil for bistable operation and the other of said cores being constructed of material of low retentivity and being provided with a coil for normally energizing said coil in one direction, a change in state in said first high retentivity core producing no change in the said normal energization of said low retentivity core, and an output coil on said low retentivity core for detecting a transient signal in said low retentivity core during said change of state of said high retentivity core.

References Cited in the file of this patent

UNITED STATES PATENTS

| | | |
|---|---|---|
| 2,700,703 | Nordyke | Jan. 25, 1955 |
| 2,741,757 | Devol | Apr. 10, 1956 |
| 2,781,503 | Saunders | Feb. 12, 1957 |